US009081201B2

(12) United States Patent
Yoshikawa et al.

(10) Patent No.: US 9,081,201 B2
(45) Date of Patent: Jul. 14, 2015

(54) OPTICAL UNIT AND WAVELENGTH SELECTIVE SWITCH (71) Applicant: Sumitomo Electric Industries, Ltd., Osaka-shi (JP)

(72) Inventors: Satoshi Yoshikawa, Yokohama (JP); Manabu Shiozaki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 106 days.

(21) Appl. No.: 13/939,999

(22) Filed: Jul. 11, 2013

(65) Prior Publication Data
US 2014/0016209 A1    Jan. 16, 2014

(30) Foreign Application Priority Data

Jul. 13, 2012   (JP) .................................. 2012-157847
Jun. 5, 2013   (JP) ................................. 2013-118694

(51) Int. Cl.
*G02B 27/30* (2006.01)
*G02B 6/35* (2006.01)
*G02B 6/293* (2006.01)

(52) U.S. Cl.
CPC ............ *G02B 27/30* (2013.01); *G02B 6/29313* (2013.01); *G02B 6/2931* (2013.01); *G02B 6/356* (2013.01); *G02B 6/3512* (2013.01); *G02B 6/3534* (2013.01)

(58) Field of Classification Search
USPC ........................................................ 359/641
See application file for complete search history.

(56) References Cited

U.S. PATENT DOCUMENTS

| 6,842,239 | B2 | 1/2005 | Bastue et al. | |
| 2003/0091276 | A1* | 5/2003 | Wang et al. | 385/31 |
| 2003/0179990 | A1* | 9/2003 | Weber et al. | 385/27 |
| 2007/0147219 | A1 | 6/2007 | Matsuo et al. | |

FOREIGN PATENT DOCUMENTS

| CN | 2394237 Y | 8/2000 |
| CN | 2535812 Y | 2/2003 |
| JP | 2007-178523 A | 7/2007 |

OTHER PUBLICATIONS

Notification of the First Office Action issued in Chinese Patent Application No. 201310295656.6 dated Apr. 3, 2015.

* cited by examiner

*Primary Examiner* — James Jones
(74) *Attorney, Agent, or Firm* — Venable LLP; Michael A. Sartori (57) ABSTRACT In a wavelength selective switch, a holding member is used to rotate one end of optical fibers and a collimator array around a rotation axis to thereby change an incident angle of collimated light with respect to incident surfaces of a beam expander optical system. When the incident angle of the collimated light on the beam expander optical system is changed, an amount of variation in an emission angle of light from the beam expander optical system is not proportional (inversely proportional) to the magnification of the beam expander optical system. Thus, this wavelength selective switch can easily fine-tune the incident position (beam position) of light with respect to each reflecting surface of a MEMS mirror by rotating the holding member.

12 Claims, 6 Drawing Sheets

OPTICAL UNIT AND WAVELENGTH SELECTIVE SWITCH

RELATED APPLICATION

Priority is claimed to Japanese Patent Application No. 2012-157847, filed Jul. 13, 2012, and Japanese Patent Application No 2013-118694, filed Jun. 5, 2013, the entire content of each of which is incorporated herein by reference.

TECHNICAL FIELD

The present invention relates to an optical unit and a wavelength selective switch.

BACKGROUND

Japanese Patent Laid-Open No. 2007-178523 discloses a wavelength selective switch. The wavelength selective switch disclosed in Japanese Patent Laid-Open No. 2007-178523 includes a fiber array for receiving wavelength-multiplexed light; a grating for dispersing the wavelength-multiplexed light received from the fiber array; a Littrow lens for focusing the light dispersed by the grating on a predetermined position; a MEMS module having a MEMS mirror array for reflecting the light focused by the Littrow lens; and a base having these mounted thereon.

SUMMARY

In the wavelength selective switch disclosed in Japanese Patent Laid-Open No. 2007-178523, the position of the MEMS module is adjusted in the following manner. Specifically, in the wavelength selective switch disclosed in Japanese Patent Laid-Open No. 2007-178523, the MEMS module is disposed between a pair of pins protrudingly provided on the base and a plate with a predetermined thickness is also disposed between the MEMS module and the pins. Then, the position of the MEMS module is adjusted by changing the plate. In this manner, the wavelength selective switch disclosed in Japanese Patent Laid-Open No. 2007-178523 uses the pins and the plate to allow for ease of adjustment of the position of the MEMS module.

However, even if the configuration of the wavelength selective switch disclosed Japanese Patent Laid-Open No. 2007-178523 can achieve ease of adjustment of the position of the MEMS module, the configuration thereof further requires adjustment of the position of the fiber array, the grating, and other optical members in order to correct a shift in beam position with respect to the MEMS mirror array. For this reason, the wavelength selective switch disclosed in Japanese Patent Laid-Open No. 2007-178523 cannot easily reduce loss due to a shift in beam position.

By the way, in an optical device that disperses wavelength-multiplexed light for each predetermined wavelength component in the same manner as in the aforementioned wavelength selective switch, in order to prevent cross-talk between light of each wavelength component after dispersion, it is desirable to provide a beam expander optical system for expanding the beam diameter of the wavelength-multiplexed light in front of the grating. In order to reduce the aforementioned loss in the wavelength selective switch having the beam expander optical system configured as described above, for example, it can be considered to correct a beam position by adjusting an incident position of the wavelength-multiplexed light in the beam expander optical system.

However, when the incident position of the wavelength-multiplexed light on the beam expander optical system is parallel-moved with respect to the incident surface of the beam expander optical system, an amount of variation in emission position of the wavelength-multiplexed light from the beam expander optical system increases in proportion to a magnification of the beam expander optical system. Thus, such a method is difficult to fine-tune the beam position.

The present invention has been made in view of such circumstances, and an object of the present invention is to provide an optical unit allowing for fine-tuning a beam position and a wavelength selective switch.

An aspect of the present invention relates to an optical unit. The optical unit includes: a collimating optical system that is connected to one end of an optical fiber, collimates light from the optical fiber, and emits collimated light; a beam expander optical system that receives, through an incident surface thereof, the collimated light emitted from the collimating optical system, expands a beam diameter of the collimated light, and emits the collimated light; an optical substrate that mounts the collimating optical system and the beam expander optical system on a main surface thereof; and a rotating mechanism that rotates the one end of the optical fiber and the collimating optical system around a first rotation axis along a first direction perpendicular to the main surface of the optical substrate to thereby change an incident angle of the collimated light with respect to the incident surface of the beam expander optical system.

The present invention will be more fully understood from the detailed description given herein below and the accompanying drawings, which are given by way of illustration only and are not to be considered as limiting the present invention.

Further, scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DETAILED DESCRIPTION

[Explanation of the Embodiment]

Firstly, the contents of the embodiment of the present invention will be listed and explained below.

An aspect of the present invention relates to an optical unit. The optical unit includes: a collimating optical system that is connected to one end of an optical fiber, collimates light from the optical fiber, and emits collimated light; a beam expander optical system that receives, through an incident surface thereof, the collimated light emitted from the collimating optical system, expands a beam diameter of the collimated light, and emits the collimated light; an optical substrate that mounts the collimating optical system and the beam expander optical system on a main surface thereof; and a rotating mechanism that rotates the one end of the optical fiber and the collimating optical system around a first rotation axis along a first direction perpendicular to the main surface of the optical substrate to thereby change an incident angle of the collimated light with respect to the incident surface of the beam expander optical system.

In this optical unit, the rotating mechanism rotates the collimating optical system and the like around the rotation axis to thereby change the incident angle of the collimated light with respect to the incident surface of the beam expander optical system. When the incident angle of light on the beam expander optical system is changed in this manner, an amount of variation in emission angle of light from the beam expander optical system is not proportional to the magnification of the beam expander optical system (for example, inversely proportional to the magnification). Thus, this optical unit can fine-tune the beam position.

In the optical unit according to an aspect of the present invention, the beam expander optical system may be an anamorphic optical system that expands the beam diameter along a second direction parallel to the main surface of the optical substrate. In this case, the first rotation axis in the rotating mechanism is perpendicular to a beam expansion direction in the beam expander optical system, thereby allowing for limiting a rotational direction of the collimating optical system and the like by the rotating mechanism to the beam expansion direction in the beam expander optical system.

In the optical unit according to an aspect of the present invention, the collimating optical system may be a collimator array connected to each one end of a plurality of optical fibers arranged along the first direction. In this case, the one end of the plurality of optical fibers and the collimator array can be collectively rotated around the first rotation axis. Thus, the optical unit can be suitably applied to an optical device such as for returning light from an optical fiber to another optical fiber.

In the optical unit according to an aspect of the present invention, the collimating optical system may include an incident portion of light from the optical fiber and an emitting portion of the collimated light, wherein the first rotation axis may be located closer to a side of the incident portion of the collimating optical system than the emitting portion of the collimating optical system. In this case, the collimating optical system and the like are rotated around a position closer to the incident portion of the collimating optical system. Thus, the incident position of the collimated light with respect to the incident surface of the beam expander optical system can be appropriately varied by rotating the collimating optical system and the like. Thereby, for example, even if the beam expander optical system has a relatively large magnification, an amount of variation in reaching position of the light emitted from the beam expander optical system can be sufficiently secured. As a result, the reaching position of the light emitted from the beam expander optical system can be efficiently adjusted.

In the optical unit according to an aspect of the present invention, the collimating optical system may include an incident portion of light from the optical fiber and an emitting portion of the collimated light, wherein the first rotation axis may be located closer to a side of the emitting portion of the collimating optical system than the incident portion of the collimating optical system. In this case, the collimating opti-cal system and the like are rotated around a position closer to the emitting portion of the collimating optical system. Thus, when the collimating optical system and the like are rotated, a variation in the incident position of the collimated light with respect to the incident surface of the beam expander optical system can be reduced.

The optical unit according to an aspect of the present invention may further includes optical axis adjusting means that adjusts a direction of light emitted from the beam expander optical system along the first direction. In this case, it is possible to compensate for a variation in emission angle of light from the beam expander optical system.

Here, another aspect of the present invention relates to a wavelength selective switch. This wavelength selective switch includes: a collimating optical system that is connected to one end of a plurality of optical fibers including an input port and an output port, collimates wavelength-multiplexed light from the input port, and emits collimated light; a beam expander optical system that receives, through an incident surface thereof, the collimated light emitted from the collimating optical system, expands a beam diameter of the collimated light, and emits the collimated light; a dispersive element that disperses light emitted from the beam expander optical system for each predetermined wavelength component, and emits each wavelength component light; an optical substrate that mounts the collimating optical system, the beam expander optical system, and the dispersive element on a main surface thereof; an optical engine that directs light emitted from the dispersive element toward the output port different for each the predetermined wavelength component; and a rotating mechanism that rotates the one end of the plurality of optical fibers and the collimating optical system around a rotation axis along a first direction perpendicular to the main surface of the optical substrate to thereby change an incident angle of the collimated light with respect to the incident surface of the beam expander optical system.

In this wavelength selective switch, the rotating mechanism rotates the collimating optical system and the like around a rotation axis thereof to thereby change an incident angle of the collimated light with respect to the incident surface of the beam expander optical system. As described above, when the incident angle of light on the beam expander optical system is changed, an amount of variation in emission angle of light from the beam expander optical system is not proportional to the magnification of the beam expander optical system. Thus, this wavelength selective switch can fine-tune the beam position (for example, the incident position of light on each reflecting surface of the optical engine), and thus can easily reduce loss.

In the wavelength selective switch according to another aspect of the present invention, the plurality of optical fibers may be arranged along the first direction, the beam expander optical system may be an anamorphic optical system that expands a beam diameter thereof along a second direction parallel to the main surface of the optical substrate, and the dispersive element may disperse light emitted from the beam expander optical system in the second direction. In this case, the first rotation axis in the rotating mechanism is perpendicular to a beam expansion direction in the beam expander optical system, thereby allowing for limiting a rotational direction of the collimating optical system and the like by the rotating mechanism to the beam expansion direction in the beam expander optical system. Also, the beam expansion direction matches the dispersion direction, thus allowing for reliably suppressing cross-talk between light after dispersion.

In the wavelength selective switch according to another aspect of the present invention, the collimating optical system may include an incident portion of the wavelength-multiplexed light from the input port and an emitting portion of the collimated light, and the first rotation axis may be located closer to a side of the incident portion of the collimating optical system than the emitting portion of the collimating optical system. In this case, the collimating optical system and the like are rotated around a position closer to the incident portion of the collimating operation system. Thus, the incident position of the collimated light with respect to the incident surface of the beam expander optical system can be appropriately varied by rotating the collimating optical system and the like. Thereby, for example, even if the beam expander optical system has a relatively large magnification, an amount of variation in reaching position of the light emitted from the beam expander optical system can be sufficiently secured. As a result, the reaching position of the light emitted from the beam expander optical system can be efficiently adjusted.

In the wavelength selective switch according to another aspect of the present invention, the collimating optical system may include an incident portion of the wavelength-multiplexed light from the input port and an emitting portion of the collimated light, and the first rotation axis may be located closer to a side of the emitting portion of the collimating optical system than the incident portion of the collimating optical system. In this case, the collimating optical system and the like are rotated in a position closer to the emitting portion of the collimating optical system. Thus, when the collimating optical system and the like are rotated, an amount of variation in the incident position of the collimated light with respect to the incident surface of the beam expander optical system can be reduced.

The wavelength selective switch according to another aspect of the present invention may further include optical axis adjusting means that adjusts a direction of light emitted from the dispersive element along the first direction by rotating the dispersive element around a second rotation axis along the first rotation axis. In addition, the wavelength selective switch according to another aspect of the present invention may further include control means that adjusts a direction of light by controlling the optical engine. In these cases, it is possible to further reduce loss by compensating for a variation in emission angle of light from the beam expander optical system.

[Details of the Embodiment]

There follows a detailed description of an optical unit and a wavelength selective switch according to the present embodiment with reference to the accompanying drawings. Note that in the following drawings, the same reference numerals or characters are assigned to the same or similar elements and the duplicate description is omitted. The dimensional ratios in the following drawings may be different from the actual dimensional ratios.

Figure 1:
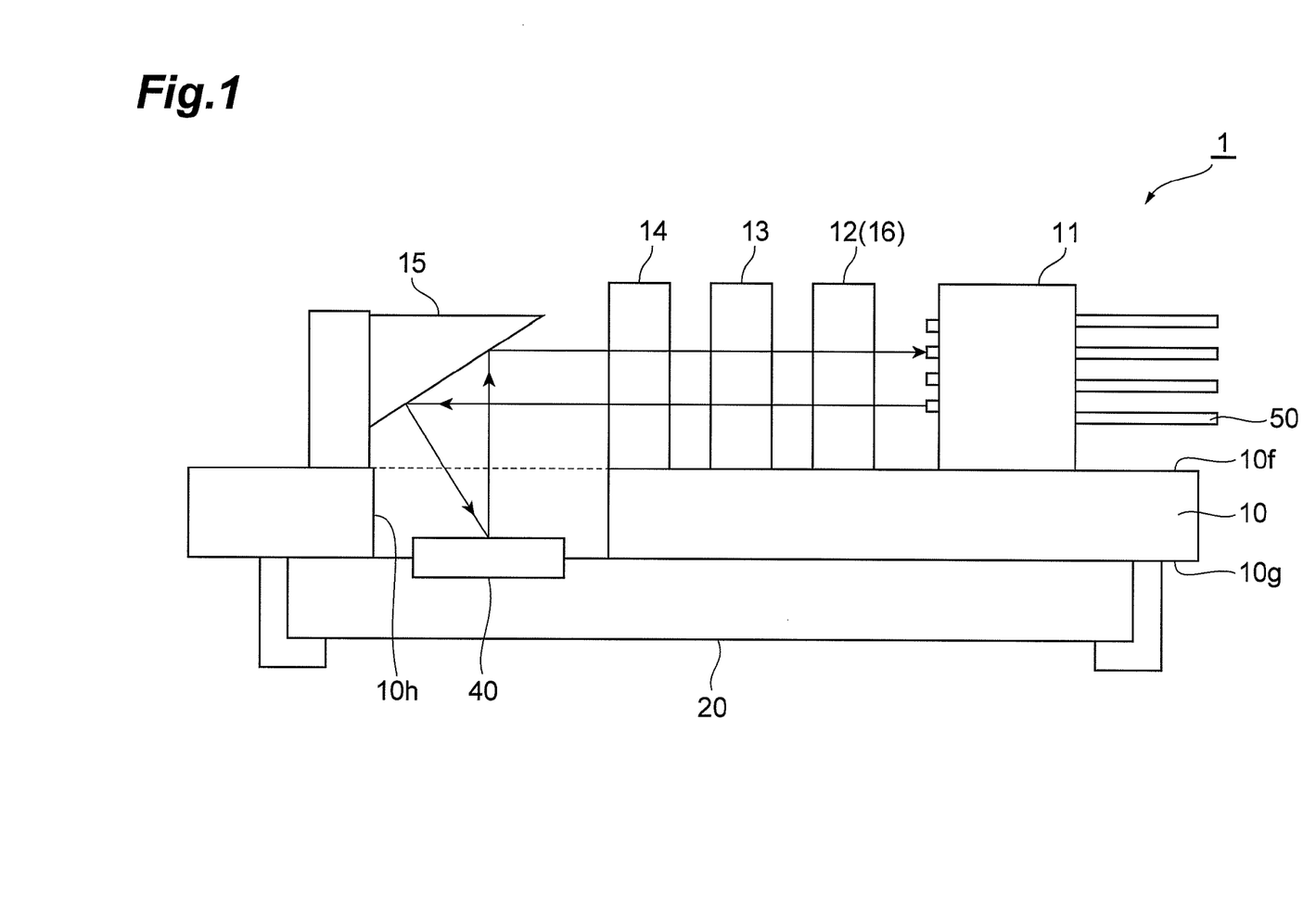
FIG. 1 is a schematic cross-sectional view illustrating a configuration of a wavelength selective switch according to the present embodiment.
Figure 2:
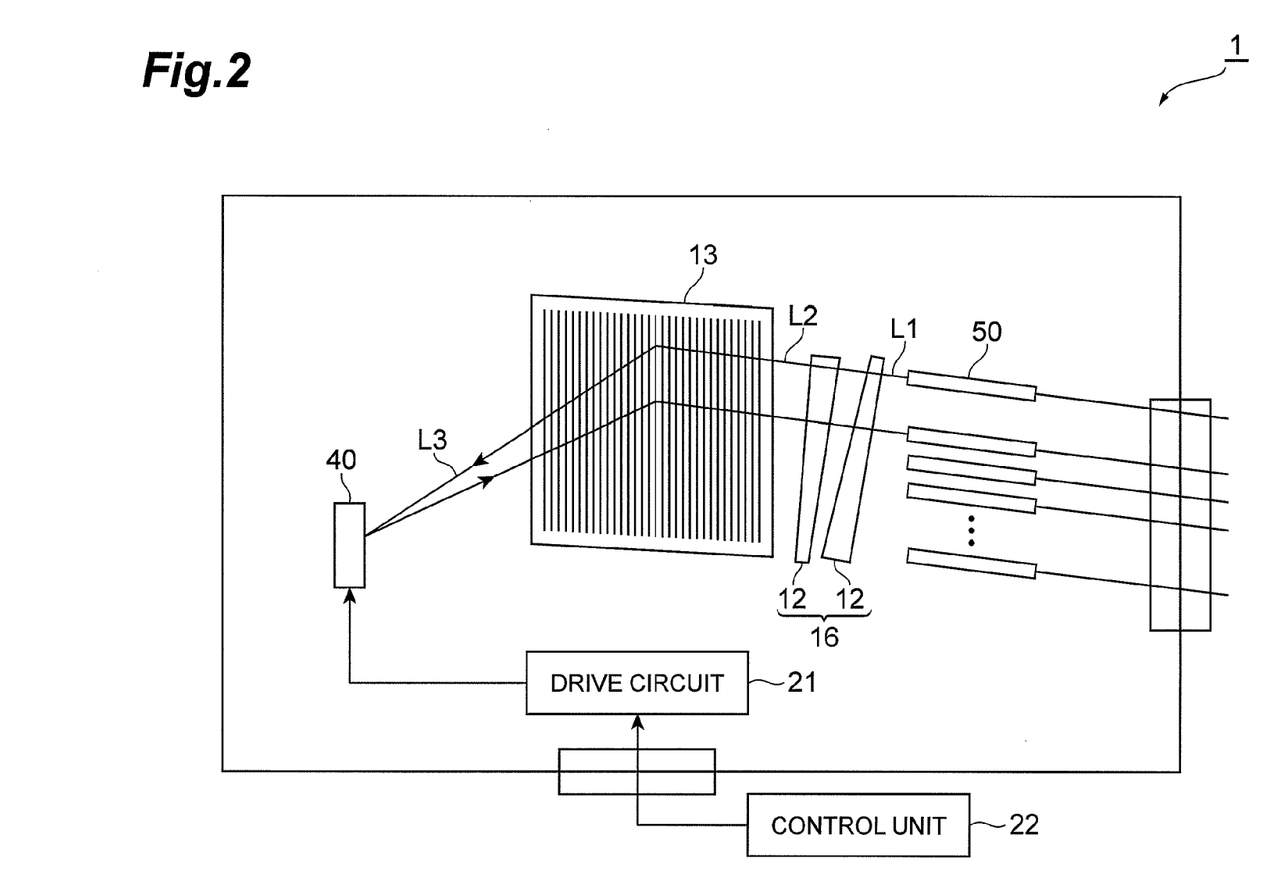
FIG. 2 is a schematic view for describing an operation of the wavelength selective switch illustrated in FIG. 1.

FIG. 1 is a schematic cross-sectional view illustrating a configuration of a wavelength selective switch according to the present embodiment. FIG. 2 is a schematic view for describing an operation of the wavelength selective switch illustrated in FIG. 1. A wavelength selective switch 1 illustrated in FIG. 1 includes an embodiment of an optical unit according to the present embodiment, and thus the following description focuses mainly on the wavelength selective switch 1. As illustrated in FIG. 1, the wavelength selective switch 1 includes an optical substrate 10, an electric board 20, a MEMS (Micro Electro Mechanical System) mirror (optical engine) 40, and a plurality of optical fibers 50. Note that the optical substrate 10 has an opening 10h thereon and a folding mirror 15 is disposed immediately above the opening 10h.

Various optical components for achieving the function of the wavelength selective switch 1 are mounted on the surface (main surface) 10f of the optical substrate 10.

There follows a description of an operation of the wavelength selective switch 1 with reference to FIG. 2. As illustrated in FIG. 2, in the wavelength selective switch 1, first, wavelength-multiplexed light L1 is inputted from an input port (optical fiber 50). The wavelength-multiplexed light L1 inputted from the input port passes through a beam expander optical system 16 made of, for example, a plurality of prisms 12, and therethrough a beam diameter thereof is expanded. The magnification of the beam diameter is, for example, about 12 to 15 times. The wavelength-multiplexed light L2 whose beam diameter is expanded by the beam expander optical system 16 is incident on a diffraction grating 13. The wavelength-multiplexed light L2 incident on the diffraction grating 13 is dispersed for each predetermined wavelength component and then is emitted from the diffraction grating 13. Each wavelength component light L3 passing through the diffraction grating 13 undergoes adjustment of an optical path thereof by an unillustrated folding mirror and the like, and then is guided to a reflecting surface of a MEMS mirror 40.

Each wavelength component light L3 incident on the reflecting surface of the MEMS mirror 40 is reflected in a direction different for each wavelength component, follows the aforementioned path in reverse, and is outputted from each different output port (optical fiber 50). In other word, the MEMS mirror 40 receives each wavelength component light L3 and emits light to an output port different for each wavelength component. Note that FIG. 2 illustrates predetermined wavelength component light as representative of each wavelength component light L3 from the diffraction grating 13. Thus, the MEMS mirror 40 has a plurality of reflecting surfaces each provided corresponding to each wavelength component light L3 and can switch the optical path independently. The MEMS mirror 40 is electrically connected to and driven by a drive circuit 21 mounted on the electric board 20. The operation of the drive circuit 21 is controlled by a control signal from a control unit 22 electrically connected thereto.

Then, with reference to FIGS. 1 and 4, the configuration of the wavelength selective switch 1 will be described. The optical components mounted on the surface 10f of the optical substrate 10 include a collimator array (collimating optical system) 11, a beam expander optical system (for example, a plurality of prisms 12) 16, a diffraction grating (dispersive element) 13, a condenser lens 14, and a folding mirror 15, each arranged in this order on the optical path of light emitted from the optical fibers 50 toward the MEMS mirror 40.

The collimator array 11 is connected to one end of a plurality of optical fibers 50, collimates wavelength-multiplexed light from the optical fibers 50 as the input port, and emits collimated light L1. In addition, the collimator array 11 has an incident portion 11a of the wavelength-multiplexed light from the optical fibers 50 as the input port and an emitting portion 11b of the collimated light L. The beam expander optical system 16 receives, through incident surfaces 16s, the collimated light L1 emitted from the collimator array 11, expands a beam diameter of the collimated light L1, and emits the collimated light L2. The beam expander optical system 16 is an anamorphic optical system that expands the beam diameter along a direction (second direction) parallel to the surface 10f of the optical substrate 10 and is made of, for example, a combination of a plurality of prisms 12. The diffraction grating 13 disperses the light L2 emitted from the beam expander optical system 16 for each predetermined wavelength component, and emits each wavelength component light L3. The diffraction grating 13 disperses the incident light L2 in a direction (second direction) parallel to the surface 10f of the optical substrate 10. The MEMS mirror 40 has a plurality of reflecting surfaces for reflecting each wavelength component light L3 emitted from the diffraction grating 13 toward an output port different for each predetermined wavelength component.

Figure 3:
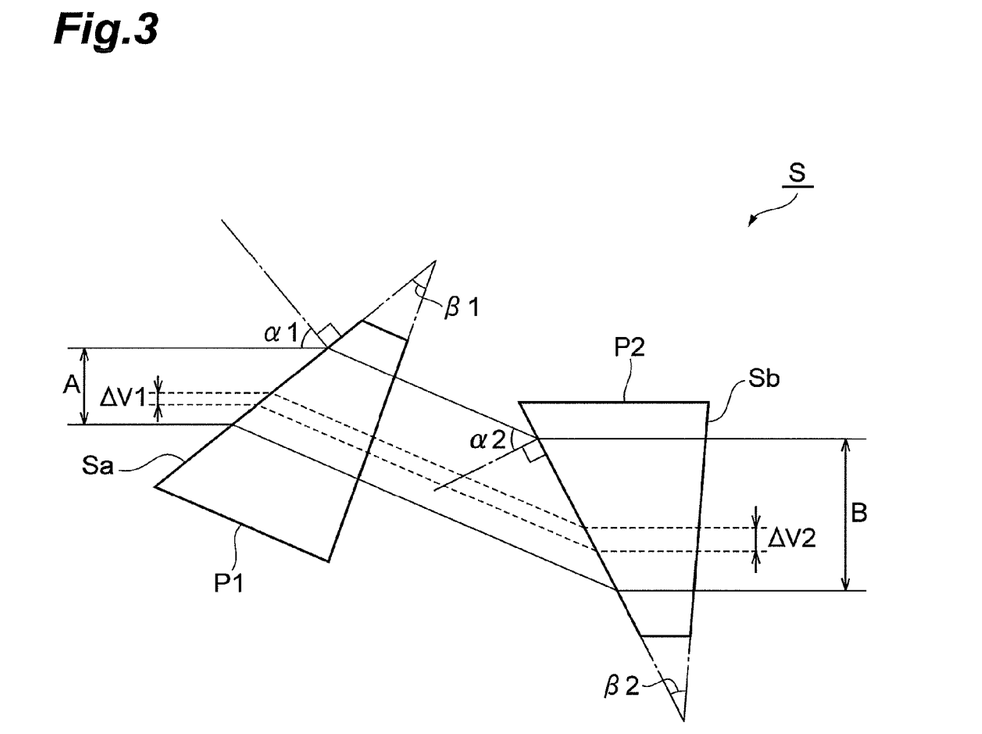
FIG. 3 is a plan view illustrating a configuration of an example of a common beam expander optical system.

Here, with reference to FIG. 3, an example of a common beam expander optical system will be described. A beam expander optical system S illustrated in FIG. 3 is an anamorphic optical system made of a pair of prisms P1 and P2 and a magnification (anamorphic ratio) thereof is B/A. In such a beam expander optical system S, when the incident position of light with respect to the incident surface (incident surface of the prism P1) Sa is moved by ΔV1 while maintaining a constant incident angle (that is, parallel-moved), a variation amount ΔV2 in the emission position of light on the emitting surface (emitting surface of the prism P2) Sb is increased in proportion to the magnification B/A.

In the wavelength selective switch 1 having the beam expander optical system 16 corresponding to such a beam expander optical system S, when the incident position of the collimated light L1 with respect to the incident surfaces 16s of the beam expander optical system 16 is parallel-moved, the emission position from the beam expander optical system 16 is similarly increased in proportion to the magnification of the beam expander optical system 16. Thus, such a method is difficult to fine-tune the incident position (beam position) of light L3 with respect to each reflecting surface of the MEMS mirror 40. In view of such a circumstance, the wavelength selective switch 1 according to the present embodiment has a configuration for easily fine-tuning the beam position.

Figure 4:
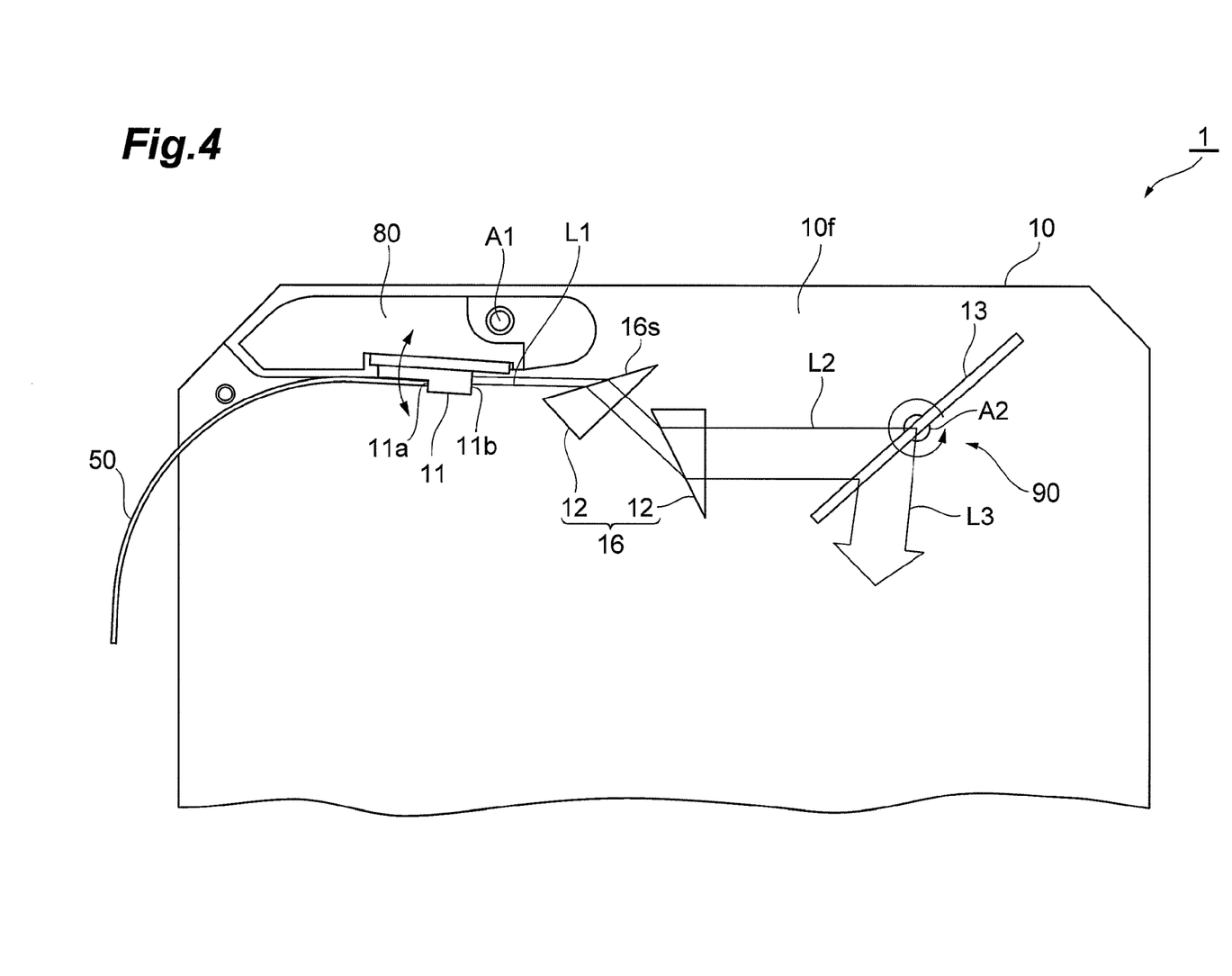
FIG. 4 is an enlarged plan view of an essential part of the wavelength selective switch illustrated in FIG. 1.

Specifically, as illustrated in FIG. 4, the wavelength selective switch 1 further includes a holding member (rotating mechanism) 80 that holds the collimator array 11. The collimator array 11 is mounted on the surface 10f of the optical substrate 10 with the holding member 80 therebetween. The holding member 80 is rotatably configured around a rotation axis (first rotation axis) A1 along a direction (direction perpendicular to the paper: first direction) perpendicular to the surface 10f of the optical substrate 10. Specifically, the holding member 80 rotatably holds one end of the optical fibers 50 and collimator array 11 around the rotation axis A1 (that is, in a plane parallel to the surface 10f of the optical substrate 10).

In the wavelength selective switch 1, such a holding member 80 can be used to rotate the one end of the optical fibers 50 and collimator array 11 around the rotation axis A1 to thereby change the incident angle of the collimated light L1 with respect to the incident surfaces 16s of the beam expander optical system 16. When the incident angle of the collimated light L1 on the beam expander optical system 16 is changed, the amount of variation in the emission angle of the light L2 from the beam expander optical system 16 is not proportional (inversely proportional) to the magnification of the beam expander optical system 16. Thus, this wavelength selective switch 1 can easily fine-tune the beam position by rotating the holding member 80, thereby allowing for easily reducing loss.

In particular, according to the present embodiment, the rotation axis A1 of the holding member 80 is located closer to a side of the emitting portion 11b than the incident portion 11a of the collimator array 11. Thus, the collimator array 11 is rotated around a position closer to the emitting portion 11b. In other word, the position of the emitting portion 11b of the collimator array 11 does not vary much when the collimator array 11 is rotated. Therefore, when the collimator array 11 is rotated, the amount of variation in the incident position of the collimated light L1 with respect to the incident surface 16s of the beam expander optical system 16 can be reduced.

Also, in the present embodiment, the beam expander optical system 16 is an anamorphic optical system that expands the beam diameter along a direction (direction parallel to the paper: second direction) parallel to the surface 10f of the optical substrate 10 and the rotation axis A1 of the holding member 80 is perpendicular to the surface 10f of the optical substrate 10, thereby allowing for limiting the rotational direction of the collimator array 11 and the like to a beam expansion direction of the beam expander optical system 16.

Note that the wavelength selective switch 1 further includes optical axis adjusting means 90 that adjusts a direction of the optical axis of light L3 each emitted from the diffraction grating 13 by rotating the diffraction grating 13 around the rotation axis A2 along the rotation axis A1.

Also, in the wavelength selective switch 1, the drive circuit 21 functions as control means that controls the MEMS mirror 40 so as to change the angle of each reflecting surface of the MEMS mirror 40 to thereby adjust the direction of the optical axis of light reflected on the reflecting surface of the MEMS mirror 40. In this way, in the wavelength selective switch 1, the direction of the optical axis is adjusted through the diffraction grating 13 and the MEMS mirror 40, thus allowing for compensating for variations in emission angle of light from the beam expander optical system 16 and further reducing loss.

The aforementioned embodiments are just embodiments of the optical unit and the wavelength selective switch according to the present invention. Thus, the optical unit and the wavelength selective switch according to the present invention are not limited to the aforementioned embodiments. The optical unit and the wavelength selective switch according to the present invention can be assumed to include any modifications to the aforementioned embodiments within the scope not changing the spirit of each claim.

Figure 5:
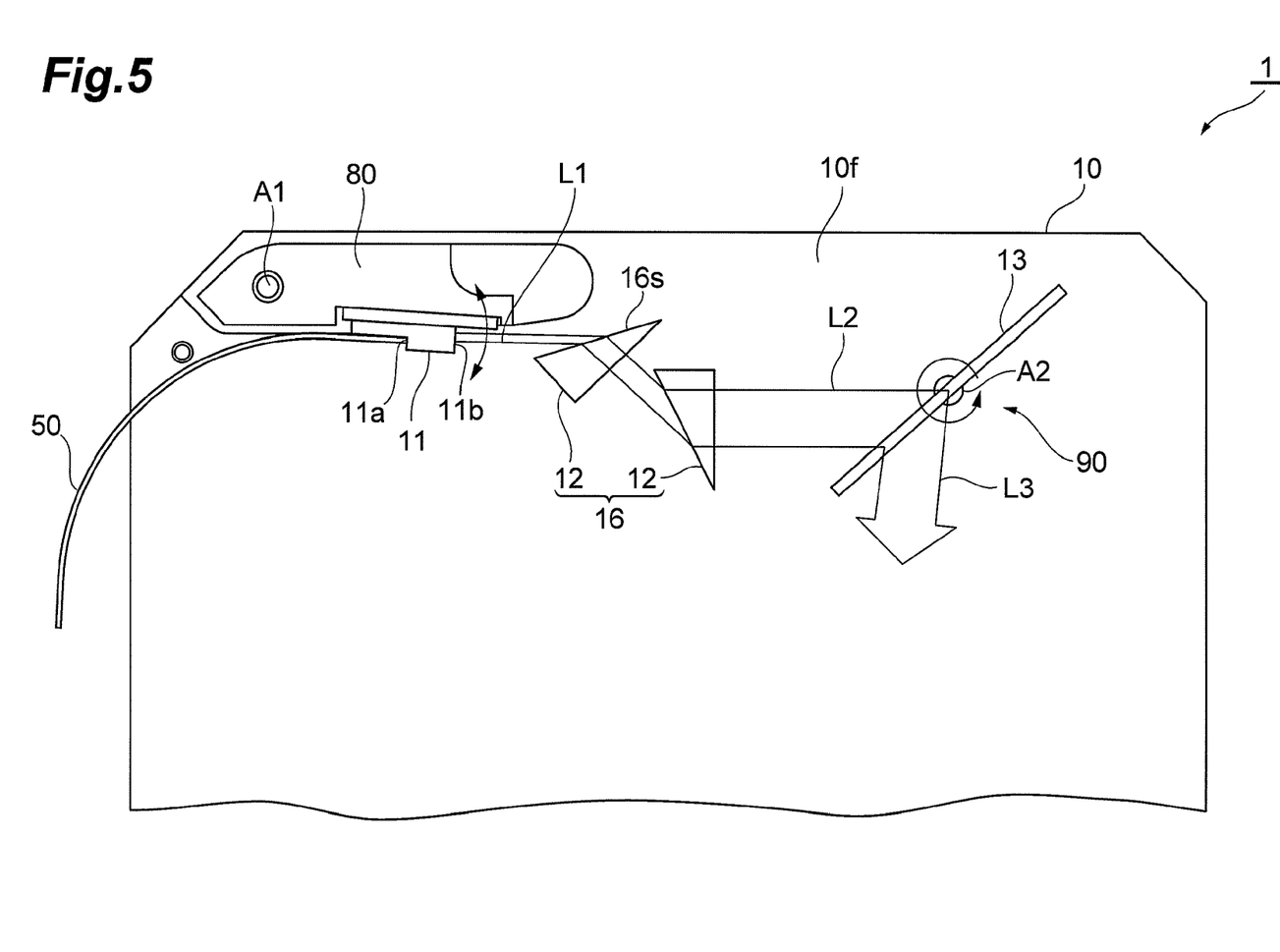
FIG. 5 is a plan view illustrating a modification of a holding member illustrated in FIG. 4.

For example, in the aforementioned embodiments, the rotation axis A1 of the holding member 80 was located closer to a side of the emitting portion 11b of the collimator array 11 than the incident portion 11a of the collimator array 11. However, as illustrated in FIG. 5, the rotation axis A1 of the holding member 80 may be located closer to a side of the incident portion 11a of the collimator array 11 than the emitting portion 11b of the collimator array 11. In this case, the collimator array 11 and the like are assumed to be rotated around a position closer to the incident portion 11a of the collimator array 11. Thus, the incident position of the collimated light L1 with respect to the incident surface 16s of the beam expander optical system 16 can be appropriately varied by rotating the collimator array 11 and the like.

Here, in a case in which the magnification of the beam diameter in the beam expander optical system 16 is relatively large, such as about 20 to 40 times, a small amount of variation in the incident position of the collimated light L1 with respect to the incident surfaces 16s of the beam expander optical system 16 may further reduce the amount of variation in the reaching position of the light L2 emitted from the beam expander optical system 16. In such a case, as described above, the collimator array 11 and the like are rotated around a position closer to the incident portion 11a of the collimator array 11 to appropriately vary the incident position of the collimated light L1 with respect to the incident surface 16s of the beam expander optical system 16, thereby allowing for sufficiently securing the amount of variation in the reaching position of the light L2 emitted from the beam expander optical system 16. As a result, even if the magnification of the beam diameter in the beam expander optical system 16 is relatively large, the reaching position of the light L2 can be efficiently adjusted.

Also, in the aforementioned embodiments, an anamorphic optical system made of a plurality of prisms is exemplified as an example of the beam expander optical system applied to the wavelength selective switch 1, but the beam expander optical system applied to the wavelength selective switch 1 is not limited to this, and for example, may be an anamorphic optical system using an anamorphic lens.

Also, in the aforementioned embodiments, the optical axis adjusting means 90 rotated the diffraction grating 13, but if an optical system using a plurality of diffraction gratings is adopted, only any one of them may be rotated, or optical axis adjusting means may be provided in every diffraction grating.

Also, in the aforementioned wavelength selective switch 1, the MEMS mirror 40 was mounted on the electric board 20, but the aspect of mounting the MEMS mirror 40 is not limited to this. For example, the MEMS mirror 40 may be mounted on the optical substrate 10 or may be mounted on any member other than the optical substrate 10 and the electric board 20.

Further, the optical engine is not limited to the MEMS mirror 40, but for example, may be an element made of transmission type liquid crystal element and birefringent crystal, or any light deflection element such as an LCOS (Liquid Crystal on Silicon) and a DLP (Digital Light Processing).

Figure 6:
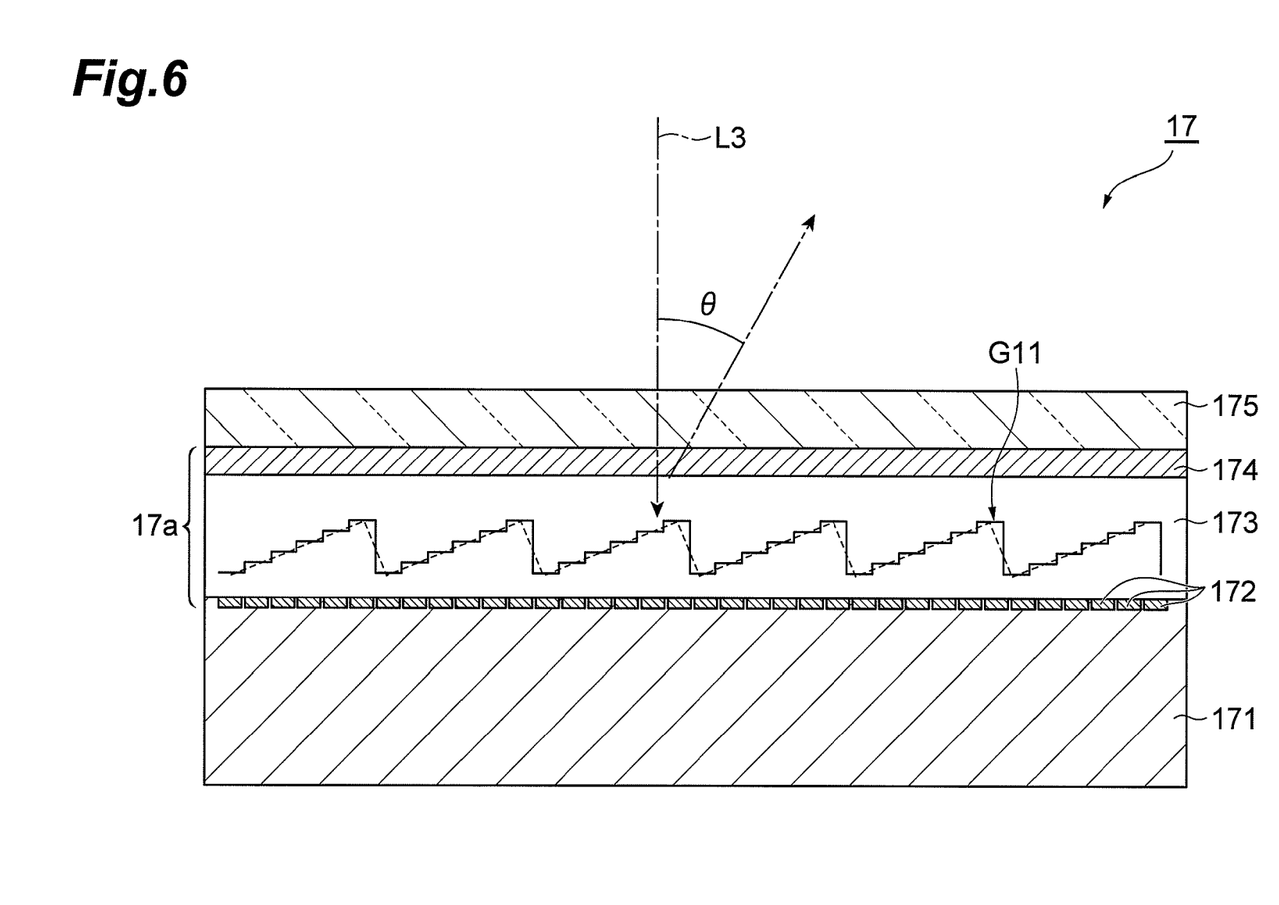
FIG. 6 is a cross-sectional view illustrating an example of a phase modulating element made of an LCOS.

For example, in the wavelength selective switch 1, a phase modulating element 17 illustrated in FIG. 6 may be adopted instead of the MEMS mirror 40. FIG. 6 is a cross-sectional view illustrating an example of the phase modulating element made of an LCOS. As illustrated in FIG. 6, the phase modulating element 17 has a silicon substrate 171 and a plurality of pixel electrodes 172 formed on a main surface of the silicon substrate 171. The plurality of pixel electrodes 172 are arranged two-dimensionally along the main surface of the silicon substrate 171. In addition, a liquid crystal layer 173, a transparent electrode 174, and a cover glass 175 are arranged in sequence on the main surface of the silicon substrate 171.

Then, the phase of each wavelength component light L3 incident on the liquid crystal layer 173 is modulated according to the magnitude of an electric field formed between the transparent electrode 174 and the plurality of pixel electrodes 172. Since an electric field with a magnitude different for each pixel electrode 172 is formed, this phase modulation amount is different for each pixel. Note that a modulation surface 17a of the phase modulating element 17 is made mainly of the plurality of pixel electrodes 172, the liquid crystal layer 173, and the transparent electrode 174. Note also that FIG. 6 illustrates conceptually the phase modulation amount for each pixel as a graph G11 when a phase modulation pattern in a diffraction grating shape is presented on the modulation surface 17a.

On the modulation surface 17a, the phase modulation amount is increased stepwise from 0 (rad) to $2\pi$ (rad), and when the phase modulation amount reaches $2\pi$ (rad), the phase modulation amount returns to 0 (rad) again, then the phase modulation amount is increased stepwise from 0 (rad) to $2\pi$ (rad). Such a phase modulation pattern causes the phase modulation pattern in a diffraction grating shape monotonically increasing in a stepwise manner to be substantially implemented. Then, when each wavelength component light L3 is incident on the modulation surface 17a presenting such a phase modulation pattern, each wavelength component light L3 is reflected at an emission angle $\theta$ according to the period of the diffraction grating. In short, the phase modulating element 17 is an optical engine that is made of a LCOS and has a plurality of reflecting surfaces (for example, each pixel on the modulation surface 17a) for reflecting light L3 emitted from the diffraction grating 13 toward an output port different for each predetermined wavelength component.

When such a phase modulating element 17 is used to perform a deflection control for coupling input light (each wavelength component light L3) to a desired output port, it is preferable to use a beam expanded in a switching direction (for example, in an array direction of the input and output ports) on the modulation surface 17a. The reason for this is that the phase modulation pattern in a diffraction grating shape monotonically increasing in a stepwise manner is formed in a switching direction on the modulation surface 17a, and thus an increase in the number of pixels contained in the beam (each wavelength component light L3) enables phase modulation of the beam by the phase modulation pattern in a more precise diffraction grating shape.

For example, there is a case where a condensing element is disposed between the beam expander optical system 16 and the phase modulating element 17; the condensing element is used to convert a beam diameter in the switching direction to a beam diameter in a direction perpendicular to the switching direction; and then a beam (that is, a beam with converted aspect ratio) is incident on the modulation surface 17a. In this case, the condensing element is interposed between the beam expander optical system 16 and the phase modulating element; and thus an expansion of a beam in a direction perpendicular to the switching direction in the beam expander optical system 16 forms a beam expanded in the switching direction on the modulation surface 17a. The beam magnification in the beam expander optical system 16 suitable for deflection control by such a phase modulating element 17 is relatively large, such as about 20 to 40 times.

Thus, in this case, as described above, a rotation of the collimator array 11 and the like around a position closer to the incident portion 11a of the collimator array 11 can sufficiently secure the amount of variation in the reaching position of the beam emitted from the beam expander optical system 16 and can efficiently adjust the reaching position of the beam. Meanwhile, a rotation of the collimator array 11 and the like around a position closer to the emitting portion 11b of the collimator array 11 can precisely adjust the reaching position of the beam.

What is claimed is:

1. An optical unit comprising:
   a collimating optical system that is connected to one end of an optical fiber, collimates light from the optical fiber, and emits collimated light;
   a beam expander optical system that receives, through an incident surface thereof, the collimated light emitted from the collimating optical system, expands a beam diameter of the collimated light, and emits the collimated light;
   an optical substrate that mounts the collimating optical system and the beam expander optical system on a main surface thereof; and
   a rotating mechanism that rotates the one end of the optical fiber and the collimating optical system around a first rotation axis along a first direction perpendicular to the main surface of the optical substrate to thereby change an incident angle of the collimated light with respect to the incident surface of the beam expander optical system.

2. The optical unit according to claim 1, wherein the beam expander optical system is an anamorphic optical system that expands the beam diameter along a second direction parallel to the main surface of the optical substrate.

3. The optical unit according to claim 1, wherein the collimating optical system is a collimator array connected to each one end of a plurality of optical fibers arranged along the first direction.

4. The optical unit according to claim 1, wherein the collimating optical system has an incident portion of light from the optical fiber and an emitting portion of the collimated light, wherein
the first rotation axis is located closer to a side of the incident portion of the collimating optical system than the emitting portion of the collimating optical system.

5. The optical unit according to claim 1, wherein the collimating optical system has an incident portion of light from the optical fiber and an emitting portion of the collimated light, wherein
the first rotation axis is located closer to a side of the emitting portion of the collimating optical system than the incident portion of the collimating optical system.

6. The optical unit according to claim 1, further comprising optical axis adjusting means that adjusts a direction of light emitted from the beam expander optical system along the first direction.

7. A wavelength selective switch comprising:
a collimating optical system that is connected to one end of a plurality of optical fibers including an input port and an output port, collimates wavelength-multiplexed light from the input port, and emits collimated light;
a beam expander optical system that receives, through an incident surface thereof, the collimated light emitted from the collimating optical system, expands a beam diameter of the collimated light, and emits the collimated light;
a dispersive element that disperses light emitted from the beam expander optical system for each predetermined wavelength component, and emits each wavelength component light;
an optical substrate that mounts the collimating optical system, the beam expander optical system, and the dispersive element on a main surface thereof;
an optical engine that directs light emitted from the dispersive element toward the output port different for each the predetermined wavelength component; and
a rotating mechanism that rotates the one end of the plurality of optical fibers and the collimating optical system around a rotation axis along a first direction perpendicular to the main surface of the optical substrate to thereby change an incident angle of the collimated light with respect to the incident surface of the beam expander optical system.

8. The wavelength selective switch according to claim 7, wherein
the plurality of optical fibers are arranged along the first direction;
the beam expander optical system is an anamorphic optical system that expands a beam diameter along a second direction parallel to the main surface of the optical substrate; and
the dispersive element disperses light emitted from the beam expander optical system in the second direction.

9. The wavelength selective switch according to claim 7, wherein
the collimating optical system has an incident portion of the wavelength-multiplexed light from the input port and an emitting portion of the collimated light; and
the first rotation axis is located closer to a side of the incident portion of the collimating optical system than the emitting portion of the collimating optical system.

10. The wavelength selective switch according to claim 7, wherein
the collimating optical system has an incident portion of the wavelength-multiplexed light from the input port and an emitting portion of the collimated light; and
the first rotation axis is located closer to a side of the emitting portion of the collimating optical system than the incident portion of the collimating optical system.

11. The wavelength selective switch according to claim 7, further comprising optical axis adjusting means that adjusts a direction of light emitted from the dispersive element along the first direction by rotating the dispersive element around a second rotation axis along the first rotation axis.

12. The wavelength selective switch according to claim 7, further comprising control means that adjusts a direction of light by controlling the optical engine.

* * * * *